US011365816B2

(12) United States Patent
Kodama

(10) Patent No.: US 11,365,816 B2
(45) Date of Patent: Jun. 21, 2022

(54) VALVE AND GAS CONTROL DEVICE

(71) Applicant: Murata Manufacturing Co., Ltd., Kyoto (JP)

(72) Inventor: Yukiharu Kodama, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/176,343

(22) Filed: Feb. 16, 2021

(65) Prior Publication Data

US 2021/0164575 A1 Jun. 3, 2021

Related U.S. Application Data

(63) Continuation of application No. PCT/JP2019/037182, filed on Sep. 24, 2019.

(30) Foreign Application Priority Data

Oct. 22, 2018 (JP) .............................. JP2018-198385

(51) Int. Cl.
*F16K 7/17* (2006.01)
*F04B 45/04* (2006.01)

(52) U.S. Cl.
CPC ............... *F16K 7/17* (2013.01); *F04B 45/04* (2013.01)

(58) Field of Classification Search
CPC ...................................................... F04B 45/04
See application file for complete search history.

(56) References Cited

U.S. PATENT DOCUMENTS

| 2015/0060012 A1 | 3/2015 | Kamitani et al. |
| 2018/0079088 A1 | 3/2018 | Takeuchi |
| 2018/0368704 A1 | 12/2018 | Kawamura et al. |

FOREIGN PATENT DOCUMENTS

| WO | 2013168551 A1 | 11/2013 |
| WO | 2016194564 A1 | 12/2016 |
| WO | 2018021099 A1 | 2/2018 |

OTHER PUBLICATIONS

Takeuchi. WO 2016/194564 A1, Translation, 2016 (Year: 2016).*
International Search Report issued in Application No. PCT/JP2019/037182, dated Dec. 17, 2019.
Written Opinion issued in Application No. PCT/JP2019/037182, dated Dec. 17, 2019.

* cited by examiner

*Primary Examiner* — Daphne M Barry
(74) *Attorney, Agent, or Firm* — Pearne & Gordon LLP

(57) ABSTRACT

A valve includes: a first plate having a first vent hole; a second plate having a second vent hole; a valve chamber positioned between the first plate and the second plate; a valve body including a third vent hole; an exhaust path-forming plate forming a first flow path between the exhaust path-forming plate and the valve body, forming a second flow path between the exhaust path-forming plate and the second plate, and having a fourth vent hole through which the first flow path is in communication with the second flow path; and a fifth vent hole. The first flow path establishes communication between the second vent hole and the fourth vent hole, and the second flow path establishes communication between the fourth vent hole and the fifth vent hole.

20 Claims, 14 Drawing Sheets

VALVE AND GAS CONTROL DEVICE

CROSS REFERENCE TO RELATED APPLICATION

This is a continuation of International Application No. PCT/JP2019/037182 filed on Sep. 24, 2019 which claims priority from Japanese Patent Application No. 2018-198385 filed on Oct. 22, 2018. The contents of these applications are incorporated herein by reference in their entireties.

BACKGROUND OF THE DISCLOSURE

Field of the Disclosure

The present disclosure relates a valve for regulating gas flow and a gas control device including the valve.

Description of the Related Art

There have been proposed various gas control devices for controlling gas flow. For example, Patent Document 1 discloses a gas control device including a piezoelectric pump, a valve, and a cuff. A diaphragm in the valve functions as a check valve so as to come into contact with or separate from a valve seat. The diaphragm in the valve functions as an exhaust valve so as to come into contact with or separate from an opening through which a second valve chamber is in communication with an exhaust path.

Patent Document 1: International Publication No. WO 2018/021099

BRIEF SUMMARY OF THE DISCLOSURE

However, the exhaust of air from an existing valve causes sounding. The sounding occurs as a result of gas flow between the diaphragm and the opening when the diaphragm undergoes transition from the state of sealing the opening in communication with the exhaust path into the state of separating from the opening. In the case of using the gas control device in a quiet environment, this sounding is heard as noise for users and annoys them.

An object of the present disclosure is to provide a valve and a gas control device that cause less sounding when gas is exhausted.

To achieve the above object, a valve according to an aspect of the present disclosure includes: a first plate having a first vent hole; a second plate positioned to face a main surface of the first plate and having a second vent hole; a valve chamber positioned between the first plate and the second plate; a valve body positioned between the first plate and the second plate and having a third vent hole, the valve body causing the first vent hole and the second vent hole not to be in communication with each other when a periphery of the third vent hole is in contact with the first plate or the second plate, and causing the first vent hole and the second vent hole to be in communication with each other when the periphery of the third vent hole is separated from the first plate and the second plate; an exhaust path-forming plate positioned between the second plate and the valve body, forming a first flow path between the exhaust path-forming plate and the valve body, forming a second flow path between the exhaust path-forming plate and the second plate, and having a fourth vent hole through which the first flow path is in communication with the second flow path; and a fifth vent hole positioned between the first plate and the exhaust path-forming plate or between the exhaust path-forming plate and the second plate. The first flow path establishes communication between the second vent hole and the fourth vent hole, and the second flow path establishes communication between the fourth vent hole and the fifth vent hole. The valve body causes the first flow path and the second flow path not to be in communication with each other when the valve body is in contact with a periphery of the fourth vent hole, and the valve body causes the first flow path and the second flow path to be in communication with each other when the valve body is separated from the periphery of the fourth vent hole. The minimum cross-sectional area of the second flow path or the cross-sectional area of the fifth vent hole is smaller than the cross-sectional area of the opening of the fourth vent hole. The direction in which the fourth vent hole extends differs from the direction in which the second flow path extends.

A gas control device according to an aspect of the present disclosure includes: the valve described above; a pump connected to the valve chamber; and a container connected to the first flow path.

A valve according to the present disclosure can provide a valve and a gas control device that cause less sounding when gas is exhausted.

DETAILED DESCRIPTION OF THE DISCLOSURE

Figure 1:
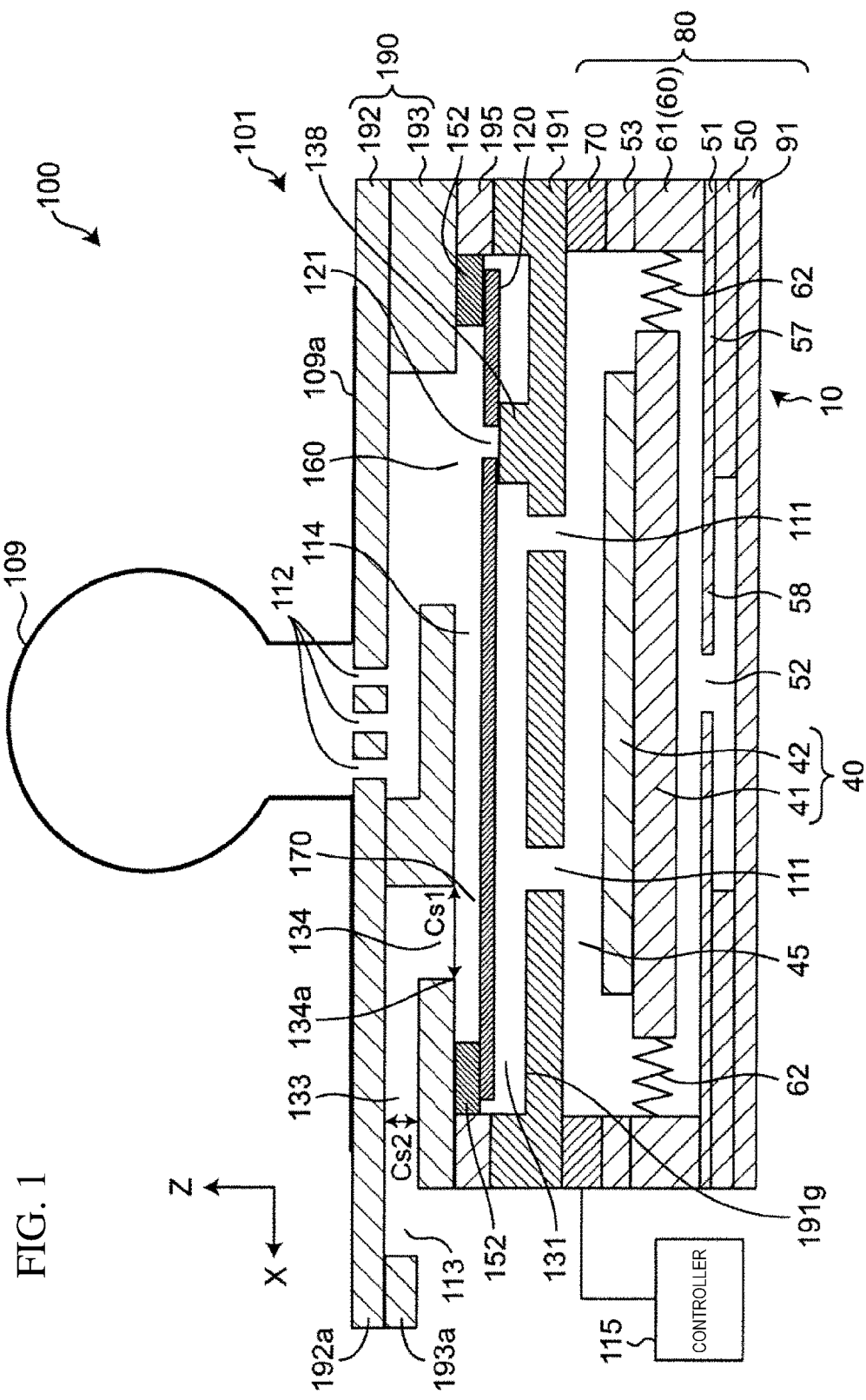
FIG. 1 is a cross-sectional view of a main part of a gas control device in a first embodiment.

A valve according to an aspect of the present disclosure includes: a first plate having a first vent hole; a second plate positioned to face a main surface of the first plate and having a second vent hole; a valve chamber positioned between the first plate and the second plate; a valve body positioned between the first plate and the second plate and having a third vent hole, the valve body causing the first vent hole and the second vent hole not to be in communication with each other when a periphery of the third vent hole is in contact with the first plate and the second plate, and causing the first vent hole and the second vent hole to be in communication with each other when the periphery of the third vent hole is separated from the first plate and the second plate; an exhaust path-forming plate positioned between the second plate and the valve body, forming a first flow path between the exhaust path-forming plate and the valve body, forming a second flow path between the exhaust path-forming plate and the second plate, and having a fourth vent hole through which the first flow path is in communication with the second flow path; and a fifth vent hole positioned between the first plate and the exhaust path-forming plate or between the exhaust path-forming plate and the second plate. The first flow path establishes communication between the second vent hole and the fourth vent hole, and the second flow path establishes communication between the fourth vent hole and the fifth vent hole. The valve body causes the first flow path and the second flow path not to be in communication with each other when the valve body is in contact with a periphery of the fourth vent hole, and the valve body causes the first flow path and the second flow path to be in communication with each other when the valve body is separated from the periphery of the fourth vent hole. The minimum cross-sectional area of the second flow path or the cross-sectional area of the fifth vent hole is smaller than the cross-sectional area of the opening of the fourth vent hole. The direction in which the fourth vent hole extends differs from the direction in which the second flow path extends.

According to this configuration, in the exhaust path from the container to the fifth vent hole, the minimum cross-sectional area of the second flow path or the cross-sectional area of the fifth vent hole is smaller than the cross-sectional area of the fourth vent hole through which the first flow path is in communication with the second flow path. Therefore, the flow rate of gas exhausted through the fifth vent hole is the highest in a region having the minimum cross-sectional area of the second flow path or at the fifth vent hole, and the flow rate of gas passing through the fourth vent hole can be reduced. This results in a low flow rate of gas flowing through the gap between the valve body and the fourth vent hole that start to separate from each other when gas is exhausted and results in less sounding at this gap. Even if the valve body enters the fourth vent hole, the valve body is unlikely to extend to the second flow path because the direction in which the fourth vent hole extends differs from the direction in which the second flow path extends. This configuration enables the valve body to move smoothly when gas is exhausted.

The minimum cross-sectional area of the second flow path may be smaller than the cross-sectional area of the opening of the fifth vent hole. According to this configuration, sounding occurs not in the fifth vent hole but in the second flow path. Since the direction in which the fourth vent hole extends differs from the direction in which the second flow path extends, sounds generated in the second flow path easily reflect inside, and sounds are unlikely to come out through the fifth vent hole. This configuration can reduce noise.

The second flow path may have a narrowing part. According to this configuration, the exhaust time can easily be designed because the exhaust time can be adjusted by the size of the cross-sectional area of a flow path formed by the narrowing part.

The valve may have multiple fifth vent holes. This configuration can prevent abnormal deformation of the valve body and can further prevent inhibition of pump vibration.

The valve may have multiple second flow paths. Since multiple second flow paths are provided, the flow rate in each second flow path can be reduced, and the fourth vent hole may have a smaller size.

The second plate may be part of a case that accommodates the valve. According to this configuration, the height of the valve can be reduced.

The first plate may have a groove around the first vent hole. When, for example, an adhesive is used for bonding between the first plate and the exhaust path-forming plate, an excess amount of the adhesive flows into the groove. This configuration can prevent the adhesive from interfering with the valve operation and the pump operation.

The first plate may have multiple first vent holes. This configuration can prevent abnormal deformation of a diaphragm 120 and can further prevent inhibition of vibration of a pump connected to the valve.

A gas control device may be configured to include the valve described above, a pump connected to the valve chamber, and a container connected to the first flow path. According to this configuration, the gas control device causes less sounding when gas is exhausted.

The valve and the gas control device according to the present disclosure will be described below with reference to the drawings. In the drawings, members having substantially the same function and the same configuration are denoted by the same reference characters, and the description of the members may be omitted herein. For easy understanding, the components are mainly and schematically illustrated in the drawings.

The embodiment described below is a specific example of the present disclosure, and the present disclosure is not limited to the configuration of the embodiment. The values, shapes, configurations, steps, sequence of steps, and the like specifically described in the following embodiment are illustrative only and are not construed as limiting the present disclosure. Among the components in the following embodiment, components that are not mentioned in independent claims indicating the broadest concept are described as optional components. This applies to the configurations described in modifications of the embodiment, and the configurations described in the modifications may be combined.

First Embodiment

Figure 2:
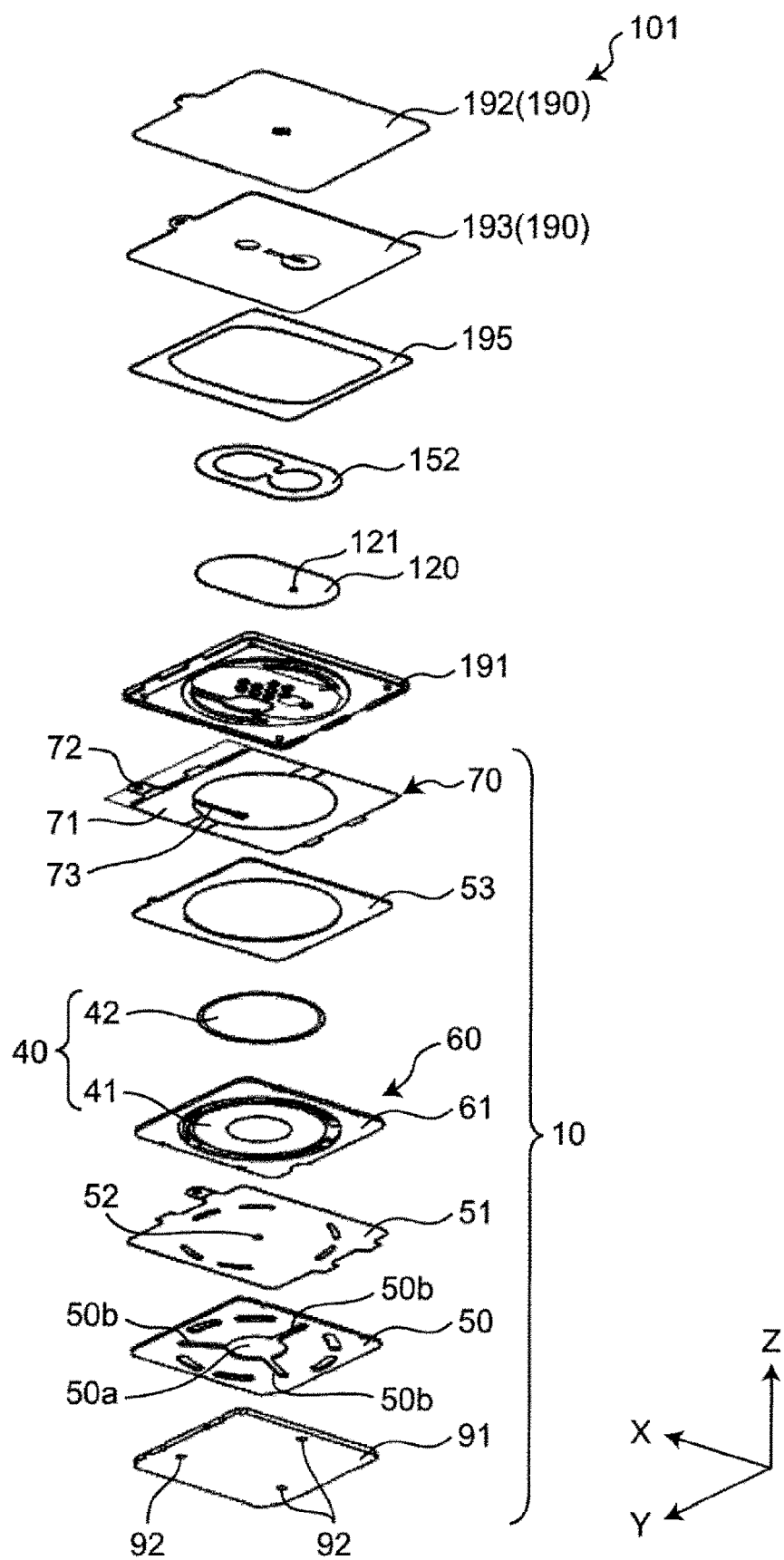
FIG. 2 is an exploded perspective view of a pump and a valve in the first embodiment.
Figure 3:
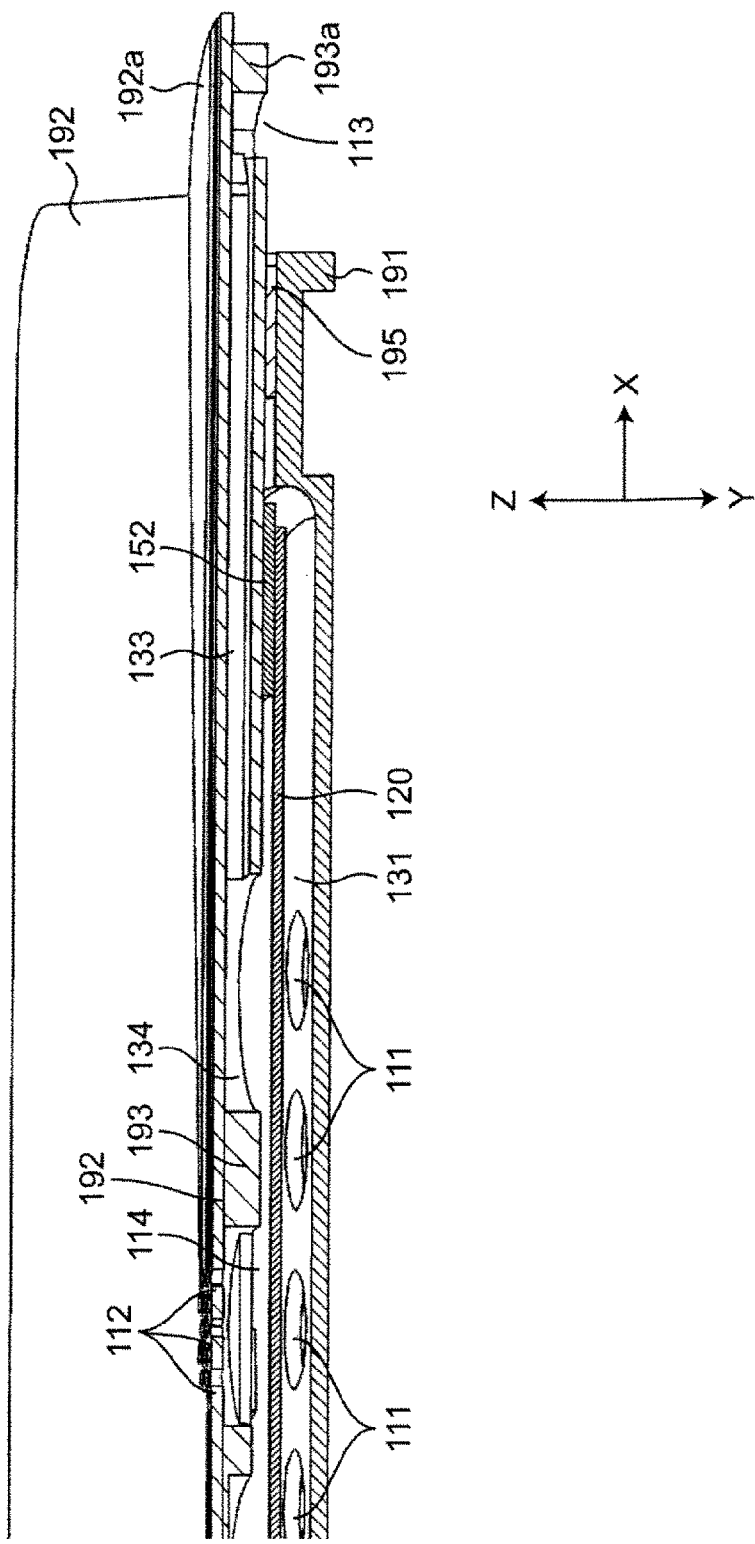
FIG. 3 is a perspective view as viewed from the longitudinal section of the valve.
Figure 4:
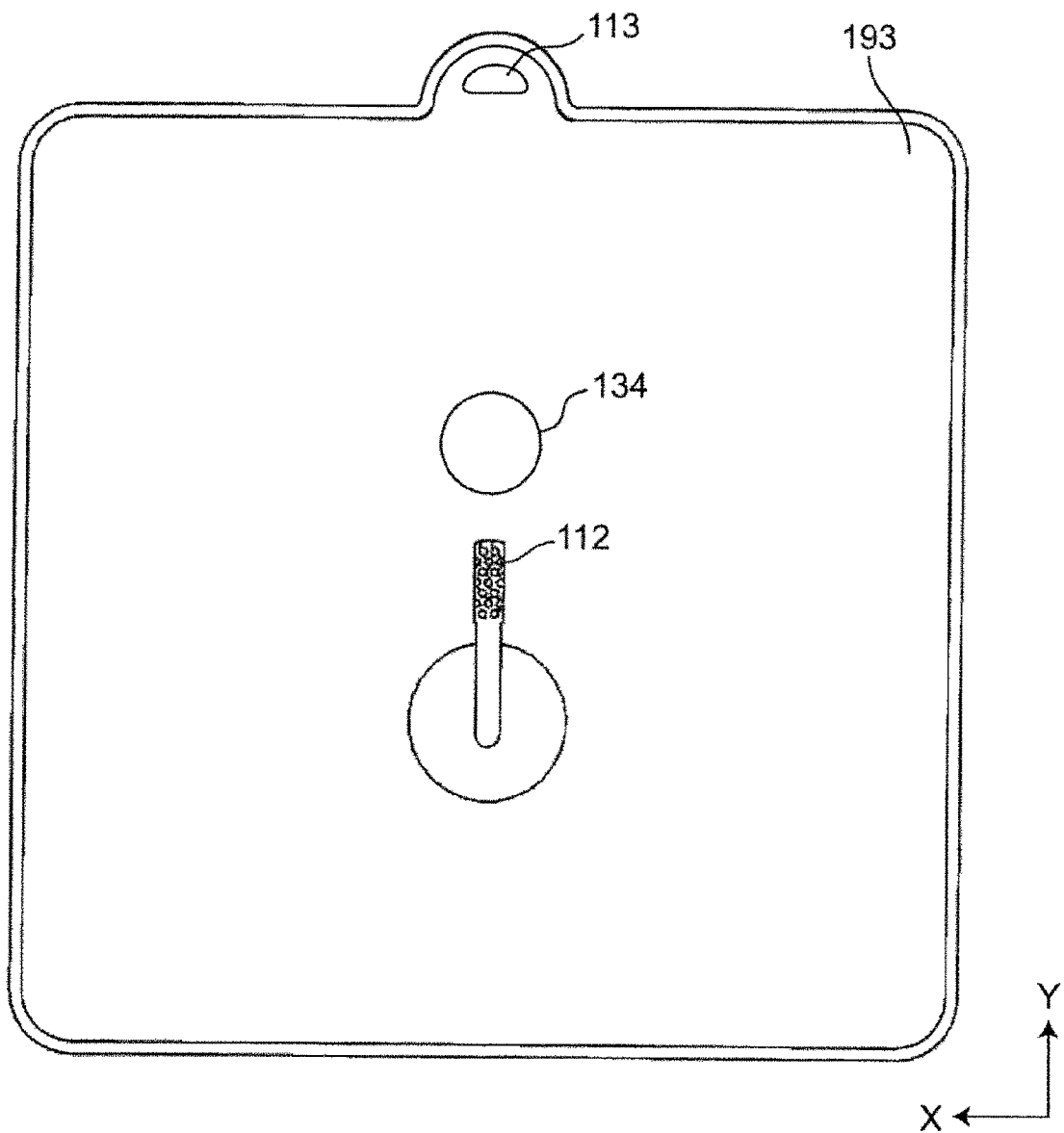
FIG. 4 is a bottom view of a case.
Figure 5:
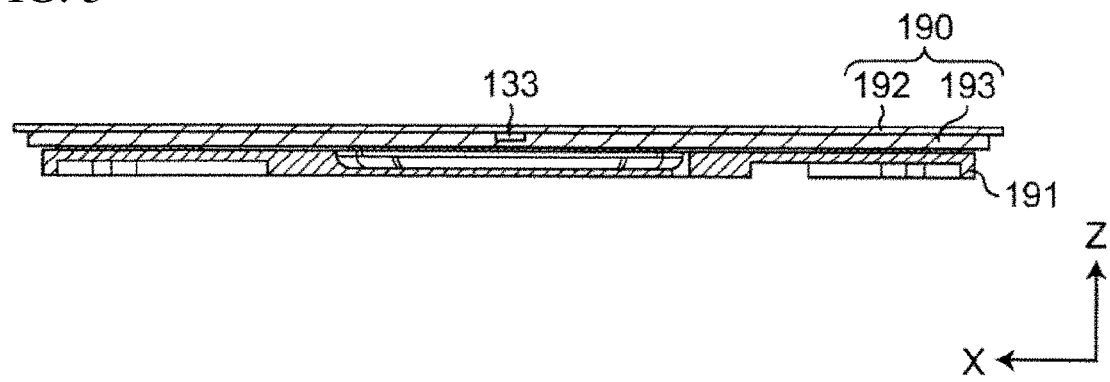
FIG. 5 is a longitudinal sectional view of the valve.

First, a gas control device will be described with reference to FIG. 1 to FIG. 3. FIG. 1 is a cross-sectional view of a main part of a gas control device 100 in a first embodiment. FIG. 2 is an exploded perspective view of a pump 10 and a valve 101 in the first embodiment. FIG. 3 is a perspective view as viewed from the longitudinal section of the valve 101. The X-axis direction indicates the direction in which a check valve 160 and an exhaust valve 170 are arranged. The Z-axis direction indicates the stacking direction (height direction) of members that constitute the pump 10 and the valve 101. The Y-axis direction indicates the direction perpendicular to the Z-axis direction and the X-axis direction.

1. Gas Control Device

The gas control device 100 includes the pump 10, the valve 101, a cuff 109, and a controller 115. The gas control device 100 is provided in, for example, a sphygmomanometer for measuring the blood pressure of a subject.

The valve 101 has a first plate 191 having first vent holes 111 and a case 190. The case 190 has a second plate 192 having second vent holes 112 and an exhaust path-forming plate 193 forming an exhaust hole 113 and a second flow path 133 between the exhaust path-forming plate and the second plate 192. The exhaust hole 113 serves as a fifth vent hole.

The valve 101 includes the check valve 160 and the exhaust valve 170. The valve 101 is connected to the cuff 109 such that a manchette rubber tube 109a of the cuff 109 is joined to the area around the second vent holes 112 of the second plate 192 by using, for example, an adhesive. The connection between the manchette rubber tube 109a and the second plate 192 may be performed by using a double-sided tape or an adhesive tape instead of using an adhesive. The exhaust hole 113 is opened to the atmosphere. The cuff 109 corresponds to an example of the "container" in the present disclosure.

The pump 10 has a pump housing 80 connected to the first vent hole. The upper surface of the pump housing 80 is joined to the bottom surface of the first plate 191 of the valve 101.

The controller 115 includes, for example, a microcomputer, a CPU, or a FGPA, and controls the operation of each component of the gas control device 100. The controller 115 is connected to the pump 10 and sends control signals to the pump 10. The controller 115 generates an AC drive voltage from a power supply and applies the AC drive voltage to the pump 10 through a power feed plate 70 to drive the pump 10. The controller 115 then measures the blood pressure on the basis of the pressure of the air stored in the cuff 109. The pressure of the air stored in the cuff 109 is detected by a pressure sensor (not shown) and inputted to the controller 115.

2. Structure of Pump

Next, the structure of the pump 10 will be described. Since the pump 10 has a similar structure to existing pumps, a brief overview of the pump 10 will be provided, and a detail description will be omitted.

The pump 10 includes a substrate 91, a flow path-forming plate 50, a flexible plate 51, a vibration plate unit 60, a piezoelectric actuator 40, a spacer 53, and the power feed plate 70, which are stacked in this order. The substrate 91, the flexible plate 51, a part of the vibration plate unit 60, the spacer 53, and the power feed plate 70 form the pump housing 80. The inner space of the pump housing 80 corresponds to a pump chamber 45.

A vibration plate 41 is flexibly and elastically supported to a frame plate 61 at three points with joints 62. A piezoelectric element 42 is disposed on the upper surface of the vibration plate 41 having a disc shape. The vibration plate 41 and the piezoelectric element 42 form the piezoelectric actuator 40 having a disc shape.

The spacer 53 made of resin is disposed on the upper surface of the frame plate 61. The spacer 53 electrically insulates the power feed plate 70 and the vibration plate unit 60 from each other.

The power feed plate 70 made of metal is disposed on the upper surface of the spacer 53. The power feed plate 70 has a frame section 71 having a substantially circular opening, an internal terminal 73 protruding inward inside the opening, and an external terminal 72 protruding outward. An end portion of the internal terminal 73 is joined to the surface of the piezoelectric element 42 by soldering. The upper surface of the power feed plate 70 is in contact with the lower surface of the valve 101.

The flexible plate 51 is disposed on the lower surface of the frame plate 61. The flexible plate 51 has a suction hole 52 at a central portion. The flexible plate 51 includes a fixed portion 57 and a movable portion 58. The fixed portion 57 is fixed to the substrate 91. The movable portion 58 is positioned nearer to the center than the fixed portion 57 and faces cavities 92. The flow path-forming plate 50 is disposed on the lower surface of the flexible plate 51.

The flow path-forming plate 50 has a columnar cavity 50a at a central portion. Linear flow paths 50b are formed radially and outward from the cavities 50a. End portions of the flow paths 50b are in communication with the cavities 92 of the substrate 91.

When the controller 115 applies an AC drive voltage to the external terminal 72 and the terminal of the flexible plate 51, the piezoelectric actuator 40 undergoes concentric flexural vibration. Furthermore, the vibration of the piezoelectric actuator 40 causes the movable portion 58 of the flexible plate 51 to vibrate. According to this configuration, the pump 10 causes air to be sucked into the pump chamber 45 through the cavities 92, which are in communication with outside, the flow paths 50b, which are in communication with the cavities 92, and the suction hole 52. Furthermore, the pump 10 discharges the air from the pump chamber 45 into the inside of the valve 101 through the first vent holes 111. The suction hole 52 is always in communication with the first vent holes 111.

3. Structure of Valve

As illustrated in FIG. 1 to FIG. 3, the valve 101 includes the first plate 191, a frame member 195, the diaphragm 120 formed of an elliptical thin film, a seal member 152 formed of an elliptical thin film, the exhaust path-forming plate 193, and the second plate 192, which are stacked in this order. According to this configuration, a first flow path 114 is formed by the inner surface of the second plate 192, the exhaust path-forming plate 193, and the diaphragm 120. The second plate 192 is positioned to face a main surface 191g of the first plate 191. The diaphragm 120 and the seal member 152 are provided in an opening region of the frame member 195. The valve 101 includes a valve chamber 131 between the first plate 191 and the second plate 192.

The frame member 195 may have a plate shape or a sheet shape. Examples of the frame member 195 having a sheet shape include an adhesive layer, such as a double-sided tape.

The exhaust path-forming plate 193 has a protrusion 193a partially protruding outward. The second plate 192 also has a protrusion 192a partially protruding outward. The exhaust path-forming plate 193 and the frame member 195 are stacked on top of each other such that the outer surface of the exhaust path-forming plate 193 is flush with the outer surface of the frame member 195, excluding the protrusions 193a and 192a.

The outer surface of the exhaust path-forming plate 193 may not be flush with the outer surface of the frame member 195. The outer surfaces of the exhaust path-forming plate 193 and the frame member 195 may form, for example, a stepped surface.

The second vent holes 112 are through-holes in the second plate 192. The opening face of the second vent holes 112 is thus flush with or substantially flush with the outer surface of the second plate 192.

The exhaust path-forming plate 193 is positioned between the second plate 192 and the diaphragm 120 in the stacking direction. The exhaust path-forming plate 193 forms the first flow path 114 together with the second plate 192 and the diaphragm 120. The first flow path 114 is positioned between the exhaust path-forming plate 193 and the diaphragm 120. The exhaust path-forming plate 193 forms the second flow path between the exhaust path-forming plate 193 and the second plate 192. The exhaust path-forming plate 193 includes a communication hole 134 through which the first flow path 114 is in communication with the second flow path 133. The communication hole 134 serves as the fourth vent hole. One end portion of the first flow path 114 is in communication with the second vent holes 112 in the second plate. The other end portion of the first flow path 114 is in communication with the second flow path 133 through the communication hole 134. The opening of the second flow path 133 adjacent to the second plate 192 is covered with the second plate 192. In this embodiment, the direction in which the communication hole 134 differs from the direction in which the second flow path 133 extends. These directions cross each other, for example, at right angles, but the directions do not necessarily cross each other at right angles. The directions may cross each other at oblique angles.

Since the exhaust path-forming plate 193 and the second plate 192 are arranged to satisfy the above relationship, the opening of the second flow path 133 adjacent to the frame member 195 except for one end portion and the other end portion is covered with the exhaust path-forming plate 193. Therefore, one end portion of the second flow path 133 formed in the exhaust path-forming plate 193 is opened toward the frame member 195. This cavity is the exhaust hole 113 serving as the fifth vent hole. The exhaust hole 113 is provided between the exhaust path-forming plate 193 and the second plate 192. The second flow path 133 establishes communication between the communication hole 134 and the exhaust hole 113. The exhaust hole 113 may be provided between the exhaust path-forming plate 193 and the first plate 191 such that the protrusion 193a of the exhaust path-forming plate 193 extends toward the first plate 191 (in the negative Z-axis direction).

The communication hole 134 is provided in the other end portion of the second flow path 133 that faces the exhaust path-forming plate 193, and the communication hole 134 at the other end portion is in communication with the first flow path 114. The first flow path 114 is partially formed by one main surface of the second plate 192 whose the other main surface forms the top surface of the valve 101. Therefore, the valve 101 can be made thinner while the first flow path 114 is formed in the in-plane direction.

The frame member 195 forms the inner space of the valve 101 together with the exhaust path-forming plate 193, the second plate 192, and the first plate 191. The diaphragm 120 is disposed in the inner space of the valve 101. The diaphragm 120 is an example of the "valve body" in the present disclosure.

The first plate 191 and the case 190 are made of, for example, metal, resin, or a mixture of these. Joining between the second plate 192, the exhaust path-forming plate 193, the frame member 195, and the first plate 191 is performed by using, for example, a double-sided tape, thermal diffusion bonding, or an adhesive.

As illustrated in FIG. 1 and FIG. 3, the second plate 192 has multiple second vent holes 112, which are in communication with the cuff 109. The second plate 192 is made of, for example, metal or resin.

As illustrated in FIG. 1 and FIG. 3, the first plate 191 has first vent holes 111, which are in communication with the pump 10. The first plate 191 is made of, for example, metal and formed by half etching. The first plate 191 has a valve seat 138 protruding toward the cuff 109.

As illustrated in FIG. 1 and FIG. 2, the diaphragm 120 has a circular hole 121 at a central portion of a region that faces the valve seat 138. The hole 121 serves as the third vent hole. The diameter of the hole 121 is smaller than the diameter of a face of the valve seat 138 that comes into contact with the diaphragm 120. The perimeter of the diaphragm 120 is smaller than the perimeters of the first plate 191 and the second plate 192. The diaphragm 120 is made of rubber, such as EPDM (ethylene propylene rubber) or silicone.

The diaphragm 120 is sandwiched between the first plate 191 and the exhaust path-forming plate 193 with the seal member 152 interposed between the diaphragm 120 and the exhaust path-forming plate 193. According to this configuration, a part of the diaphragm 120 can come into contact with the communication hole 134 of the exhaust path-forming plate 193, and the periphery of the hole 121 in the diaphragm 120 can come into contact with the valve seat 138. The valve seat 138 is provided in the first plate 191 so as to press the area around the hole 121 in the diaphragm 120. The valve seat 138 is made of, for example, metal.

The diaphragm 120 divides the inner space defined by the second plate 192, the first plate 191, and the frame member 195. A portion of the inner space that is adjacent to the first plate 191 is the valve chamber (first chamber) 131, while a portion of the inner space that is adjacent to the second plate 192 is the first flow path (second chamber) 114. The diameter of a face of the valve seat 138 that comes into contact with the diaphragm 120 is, for example, 1.5 mm.

In the valve 101, a part of the seal member 152 is positioned in a first flow path 114. The seal member 152 is formed of, for example, a double-sided tape or an adhesive.

Next, the check valve 160 and the exhaust valve 170 in the valve 101 will be described.

The check valve 160 includes the periphery of the hole 121 in the diaphragm 120, and the valve seat 138 which comes into contact with the periphery of the hole 121 to cover the hole 121. In the check valve 160, the diaphragm 120 comes into contact with or separates from the valve seat 138 on the basis of the pressure of the valve chamber 131 and the pressure of the first flow path 114. The diaphragm 120 causes the first vent holes 111 and the second vent holes 112 not to be in communication with each other when the periphery of the hole 121 of the diaphragm 120 is in contact with the first plate 191. The diaphragm 120 causes the first vent holes 111 and the second vent holes 112 to be in communication with each other when the periphery of the hole 121 of the diaphragm 120 is separated from the first plate 191.

Next, the exhaust valve 170 includes a part of the diaphragm 120, and a peripheral area of a cavity 134a of the communication hole 134 that faces the diaphragm 120. In the exhaust valve 170, a part of the diaphragm 120 comes into contact with or separates from the peripheral area of the cavity 134a of the communication hole 134 on the basis of the pressure of the valve chamber 131 and the pressure of the first flow path 114.

Figure 6:
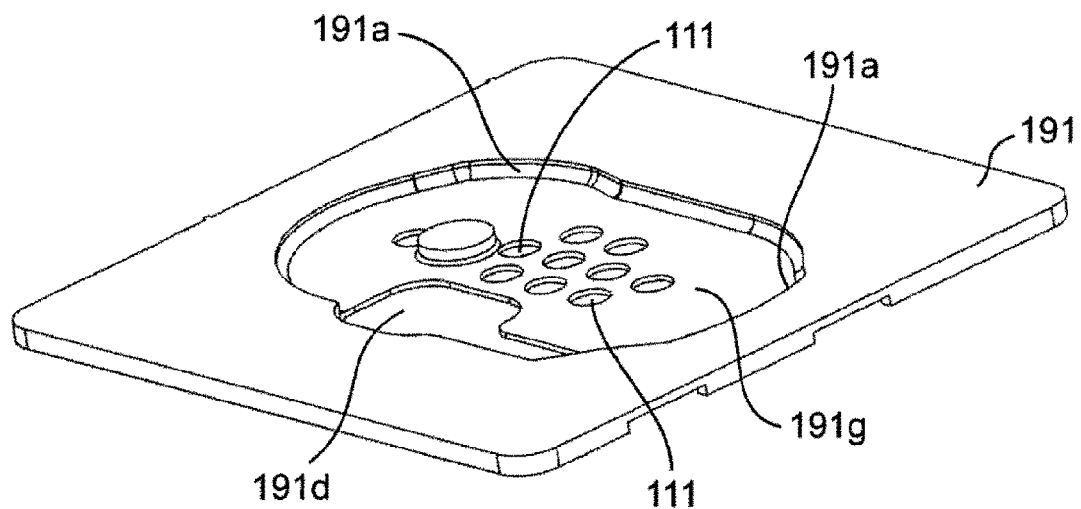
FIG. 6 is a perspective view of a first plate as viewed from the cuff.
Figure 7:
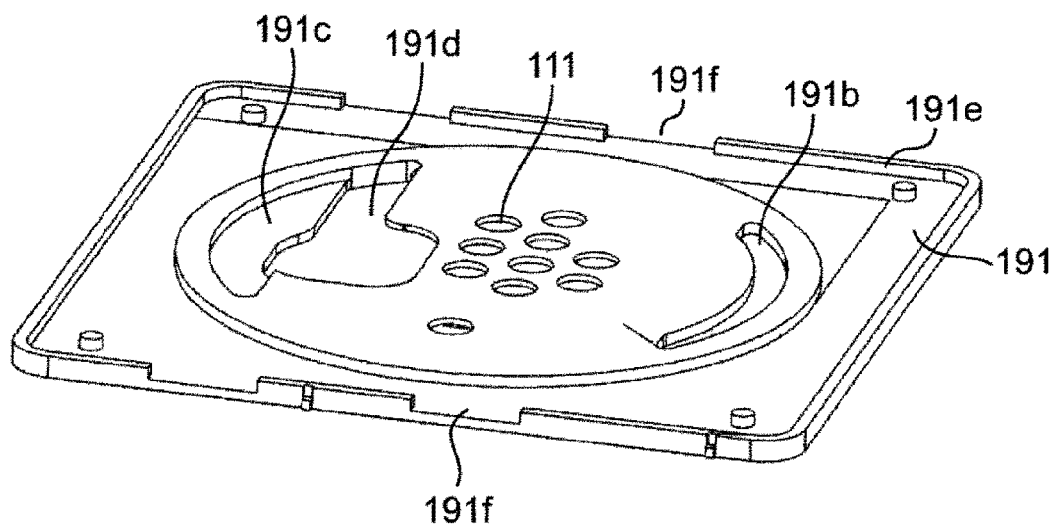
FIG. 7 is a perspective view of the first plate as viewed from the pump.

Next, the first plate 191 will be described in detail with reference to FIG. 6 and FIG. 7. FIG. 6 is a perspective view of the first plate as viewed from the cuff 109. FIG. 7 is a perspective view of the first plate as viewed from the pump 10. The first plate 191 has grooves 191a, 191b, and 191c for receiving excess adhesive used for bonding between the first plate 191 and the case 190. The adhesive is applied between the frame member 195 and the diaphragm 120 and strongly bonds the first plate 191 and the case 190. The adhesive is, for example, a silicone adhesive. The grooves 191a, 191b, and 191c are formed around the first vent holes 111. On the side of the first plate 191 adjacent to the cuff 109, the groove 191a is formed so as to surround the outer side of the first vent holes 111. On the side of the first plate 191 adjacent to the pump 10, the groove 191b having an arc shape and the groove 191c having a semicircle shape are formed nearer to the center than the groove 191a. The grooves 191a, 191b, and 191c can prevent excess adhesive from leaking from the first plate 191. When a buffer for the adhesive is thus provided in a valve storage, the adhesive flows into the buffer, which can prevent the adhesive from interfering with the valve operation and the pump operation.

The central side of the groove 191c is exposed to an opening 191d. The opening 191d is a through-hole in order to avoid the contact to the power feed terminal of the power feed plate 70. The first plate 191 has a wall portion 191e at the periphery of the first plate 191. The wall portion 191e extends toward the pump 10. The wall portion 191e has multiple recesses 191f, which are recessed toward the cuff 109. The recesses 191f reduce the transmission of the vibration of the vibration plate unit 60. In addition, the formation of the first vent holes 111 can prevent abnormal deformation of the diaphragm 120 and can further prevent inhibition of pump vibration.

Next, the operation of the gas control device 100 when it is used for blood pressure measurement will be described.

Figure 8:
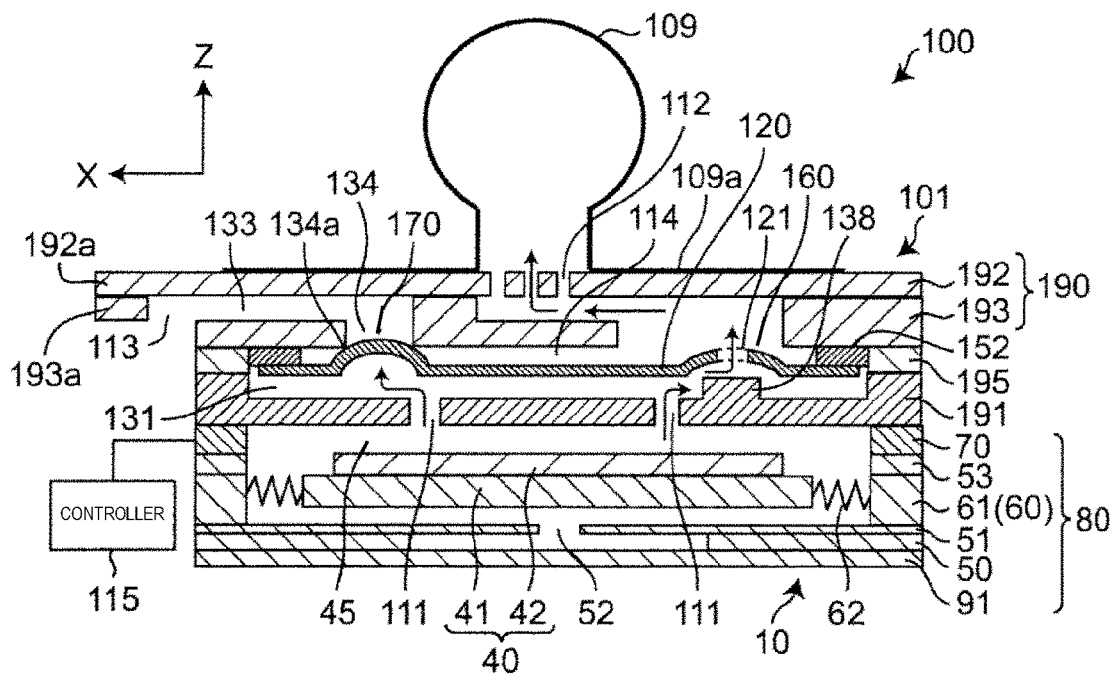
FIG. 8 is a view for describing air flow in the gas control device during driving of the pump.

FIG. 8 is a view for describing air flow in the gas control device 100 during driving of the pump 10 illustrated in FIG. 1. The controller 115 turns on the pump 10 when blood pressure measurement is started. When the pump 10 is driven, first, air flows into the pump chamber 45 in the pump 10 through the cavities 92 and the suction hole 52. Next, the air is discharged through the first vent holes 111 and flows into the valve chamber 131 of the valve 101.

In the exhaust valve 170, the pressure of the valve chamber 131 thus becomes higher than the pressure of the first flow path 114. As illustrated in FIG. 8, the diaphragm 120 seals the communication hole 134 to block connection between the second vent holes 112 and the second flow path 133.

In the check valve 160, the pressure of the valve chamber 131 becomes higher than the pressure of the first flow path 114. The area around the hole 121 in the diaphragm 120 thus separates from the valve seat 138, so that the first vent holes 111 are connected to the second vent holes 112 through the hole 121.

As a result, the air is delivered to the cuff 109 from the pump 10 through the first vent holes 111, the hole 121, and the second vent holes 112 of the valve 101, so that the pressure (air pressure) in the cuff 109 increases. The diaphragm 120 may abut the second plate 192 as a result of large deformation of the diaphragm 120.

The diaphragm 120 is fixed to the exhaust path-forming plate 193 and the first plate 191 such that the periphery of the hole 121 of the diaphragm 120 is in contact with the valve seat 138. The valve seat 138 presses the area around the hole 121 in the diaphragm 120.

The air flowing out through the hole 121 via the first vent holes 111 of the valve 101 thus has a slightly lower pressure than the discharge pressure of the pump 10 and flows into the first flow path 114 through the hole 121. The valve chamber 131 receives the discharge pressure of the pump 10.

As a result, in the valve 101, the pressure of the valve chamber 131 is slightly higher than the pressure of the first flow path 114, and the diaphragm 120 seals the communication hole 134 and maintains the hole 121 open.

Figure 9:
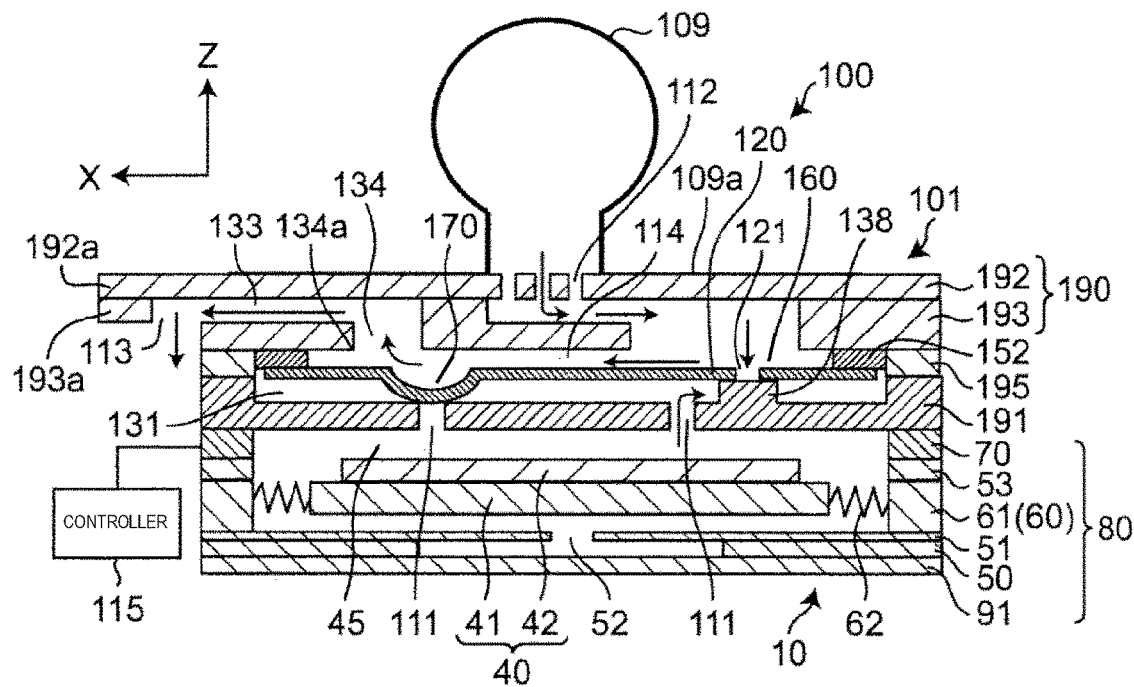
FIG. 9 is a view for describing air flow in the gas control device after the driving of the pump is stopped.

FIG. 9 is a view for describing air flow in the gas control device 100 after the driving of the pump 10 illustrated in FIG. 1 is stopped. The controller 115 turns off the pump 10 when blood pressure measurement is ended. When the driving of the pump 10 is stopped, the air in the pump chamber 45 and the valve chamber 131 is readily exhausted to the outside of the gas control device 100 through the suction hole 52 and the cavities 92 of the pump 10. The pressure of the cuff 109 is applied to the first flow path 114 through the second vent holes 112.

As a result, in the check valve 160, the pressure of the valve chamber 131 becomes lower than the pressure of the first flow path 114. The diaphragm 120 comes into contact with the valve seat 138 to seal the hole 121. In the exhaust valve 170, the pressure of the valve chamber 131 becomes lower than the pressure of the first flow path 114. The diaphragm 120 separates from the cavity 134a of the communication hole 134 and opens the second flow path 133. In other words, in the valve 101, the second vent holes 112 are connected to the second flow path 133 through the first flow path 114 and the communication hole 134.

Since the exhaust hole 113 is opened toward the pump housing 80 as described above, the air in the cuff 109 is readily discharged from the exhaust hole 113 toward the pump housing 80 via the second vent holes 112, the first flow path 114, the communication hole 134, and the second flow path 133.

As described above, the valve 101 includes: the first plate 191 having the first vent holes 111; the second plate 192 positioned to face the main surface of the first plate 191 and having the second vent holes 112; the valve chamber 131 positioned between the first plate 191 and the second plate 192; and the hole 121 positioned between the first plate 191 and the second plate 192 and serving as the third vent hole. The valve 101 further includes: the diaphragm 120, which serves as the valve body, causing the first vent holes 111 and the second vent holes 112 not to be in communication with each other when the periphery of the hole 121 is in contact with the first plate 191 and the second plate 192, and causing the first vent holes 111 and the second vent holes 112 to be in communication with each other when the periphery of the hole 121 is separated from the first plate 191 and the second plate 192; the exhaust path-forming plate 193 positioned between the second plate 192 and the diaphragm 120, forming the first flow path 114 between the exhaust path-forming plate 193 and the diaphragm 120, forming the second flow path 133 between the exhaust path-forming plate 193 and the second plate 192, and having the communication hole 134, which serves as the fourth vent hole, through which the first flow path 114 is in communication with the second flow path 133; and the exhaust hole 113, which serves as the fifth vent hole, between the first plate 191 and the exhaust path-forming plate 193 or between the exhaust path-forming plate 193 and the second plate 192. The first flow path 114 establishes communication between the second vent holes 112 and the communication hole 134, and the second flow path 133 establishes communication between the communication hole 134 and the exhaust hole 113. The diaphragm 120 causes the first flow path 114 and the second flow path 133 not to be in communication with each other when the diaphragm 120 is in contact with the periphery of the communication hole 134, and causes the first flow path 114 and the second flow path 133 to be in communication with each other when the diaphragm 120 is separated from the periphery of the communication hole 134. The minimum cross-sectional area Cs2 of the second flow path 133 or the cross-sectional area of the exhaust hole 113 is smaller than the cross-sectional area Cs1 of the opening of the communication hole 134. The direction in which the communication hole 134 extends differs from the direction in which the second flow path 133 extends. According to this configuration, in the exhaust path from the cuff 109 to the exhaust hole 113, the minimum cross-sectional area Cs2 of the second flow path 133 or the cross-sectional area of the exhaust hole 113 is smaller than the cross-sectional area Cs1 of the communication hole 134 through which the first flow path 114 is in communication with the second flow path 133. Therefore, the flow rate of gas being exhausted is the highest at the minimum cross-sectional area Cs2 of the second flow path 133 or at the exhaust hole 113, and the flow rate of gas passing through the communication hole 134 can be reduced. This results in a low flow rate of gas flowing through the gap between the diaphragm 120 and the communication hole 134 that start to separate from each other when gas is exhausted and results in less sounding at this gap. Even if the diaphragm 120 enters the communication hole 134, the diaphragm 120 is unlikely to extend to the second flow path 133 because the direction in which the communication hole 134 extends differs from the direction in which the second flow path 133 extends. This configuration enables the diaphragm 120 to move smoothly when gas is exhausted.

Since the exhaust time depends on the minimum cross-sectional area Cs2 of the second flow path 133 or the cross-sectional area of the exhaust hole 113, the cross-sectional area Cs1 of the communication hole 134 can be larger than that in the related art. The communication hole 134 having a large cross-sectional area Cs1 can lower the flow rate of the air flowing near the cavity 134a when the diaphragm 120 separates from the communication hole 134. The flow rate of gas passing through the communication hole 134 can be reduced by making the minimum cross-sectional area Cs2 of the second flow path 133 or the cross-sectional area of the exhaust hole 113 smaller than the cross-sectional area of the communication hole 134. This configuration can prevent the diaphragm 120 from being brought closer to the communication hole 134 again. This results in less vibration of the diaphragm 120 when gas is exhausted and results in low noise generated in the cavity 134a of the communication hole 134 due to vibration of the diaphragm 120.

The cross-sectional area Cs1 of the communication hole 134 is the area in the direction perpendicular or substantially perpendicular to the direction from the main surface of the first plate 191 to the main surface of the second plate 192. The cross-sectional area Cs2 of the second flow path 133 is the area of the cross-section of the flow path as viewed in the direction from the main surface of the first plate 191 to the main surface of the second plate 192.

The minimum cross-sectional area Cs2 of the second flow path 133 is smaller than the cross-sectional area of the exhaust hole 113. This configuration can reduce jet noise. Since the direction in which the communication hole 134 extends differs from the direction in which the second flow path 133 extends, sounds generated in the second flow path 133 easily reflect inside the valve 101, and sounds are unlikely to come out through the exhaust hole 113. This configuration can reduce noise.

The first vent holes 111 of the first plate 191 can prevent abnormal deformation of the diaphragm 120 and can further prevent inhibition of pump vibration.

Modification 1

Figure 10:
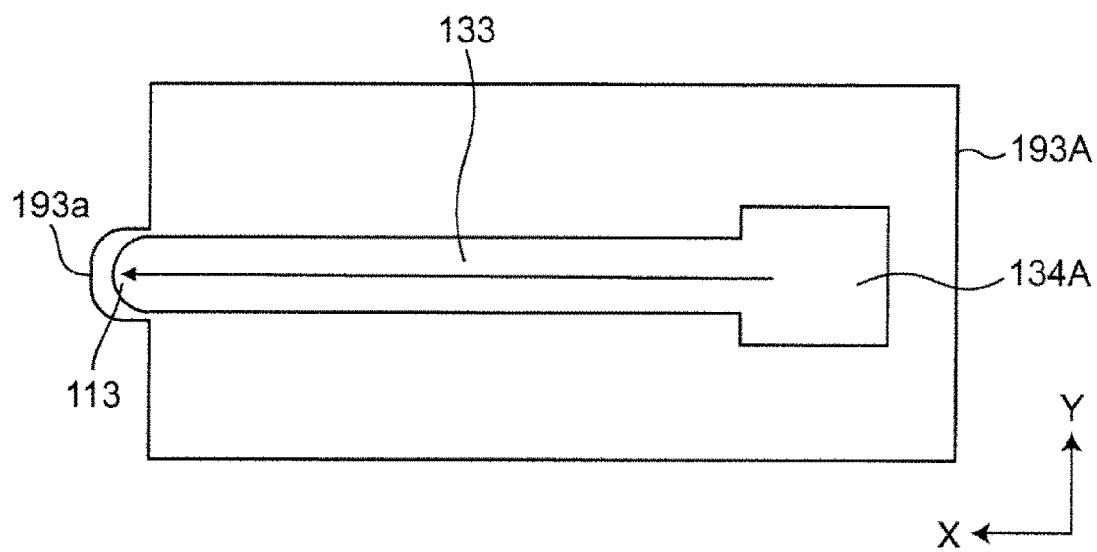
FIG. 10 is a plan view of a flow path-forming plate in a modification of the first embodiment.
Figure 11:
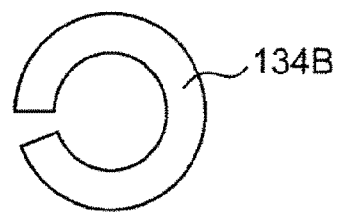
FIG. 11 is a view for describing a modification of a communication hole.
Figure 12:
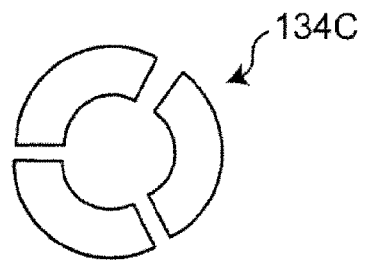
FIG. 12 is a view for describing a modification of the communication hole.

Next, a valve according to a modification of the first embodiment will be described with reference to FIG. 10 to FIG. 12. FIG. 10 is a schematic plan view of a second flow path 133 of an exhaust path-forming plate 193A and the surrounding area in Modification 1. FIG. 11 and FIG. 12 are schematic plan views of communication holes 134B and 134C in Modification 1.

The transverse section of the communication hole 134 formed in the exhaust path-forming plate 193 is not necessarily circle. For example, as illustrated in FIG. 10, the transverse section of the communication hole 134 may be square, rectangle, or rectangle including these shapes. The transverse section of the communication hole 134 may be, for example, triangle, polygon, star, or hexagram, in addition to rectangle.

The transverse section of the communication hole 134 may have a ring shape with no through-hole at the center. As illustrated in FIG. 11, the transverse section of the communication hole 134B may have a C-shape with no through-hole at the center. As illustrated in FIG. 12, the transverse section of the communication hole 134C may have a segmented ring shape with no through-hole at the center.

Modification 2

Figure 13:
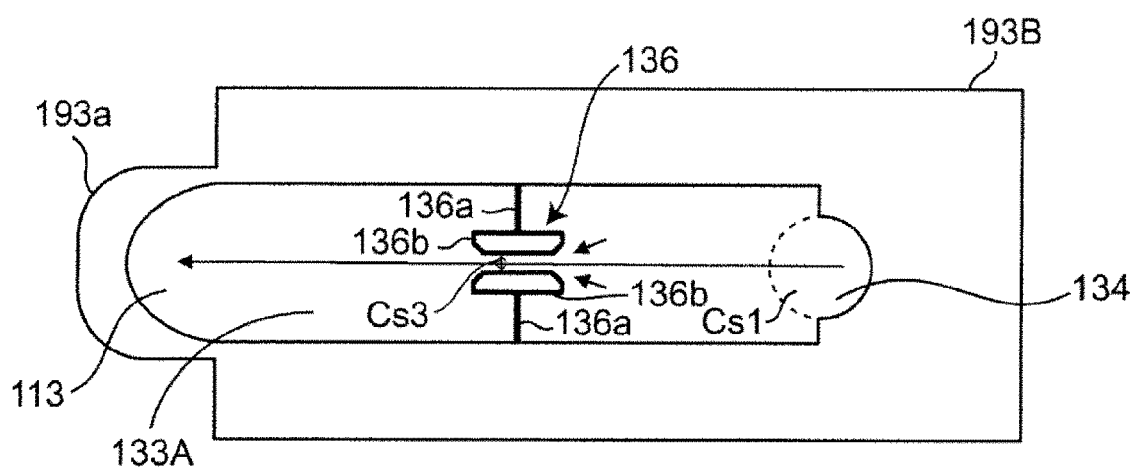
FIG. 13 is a plan view of a flow path-forming plate in a modification of the first embodiment.

Next, a valve according to a modification of the first embodiment will be described with reference to FIG. 13. FIG. 13 is a schematic plan view of a second flow path 133 of an exhaust path-forming plate 193B and the surrounding area in Modification 2. In Modification 2, the second flow path 133A has a narrowing part 136 having a cross-sectional area Cs3 smaller than the cross-sectional area of the communication hole 134. When the second flow path 133A has the narrowing part 136, the minimum cross-sectional area Cs2 of the second flow path 133A corresponds to the cross-sectional area Cs3 of the narrowing part 136. Therefore, the cross-sectional area of the second flow path 133A excluding the narrowing part 136 may be larger than the cross-sectional area Cs1 of the communication hole 134. This configuration improves the freedom of design of the communication hole 134 and the second flow path 133A. In addition, the exhaust time can easily be designed because the exhaust time can be adjusted by the size of the cross-sectional area Cs3 of a flow path formed by the narrowing part 136.

The flow path formed by the narrowing part 136 is, for example, a narrow flow path in the second flow path 133A that is distant from the inner wall of the exhaust path-forming plate 193B. The narrowing part 136 may have, for example, a wall 136a extending toward the flow path center from the inner wall of the exhaust path-forming plate 193B and a wall 136b or pipe with the cross-sectional area Cs3 connected to the wall 136a and extending in the longitudinal direction or may simply have a wall 136a having a through-hole with the cross-sectional area Cs3. The cross-sectional area Cs3 of the narrowing part 136 is smaller than the cross-sectional area Cs1 of the communication hole 134, and Cs1 and Cs3 satisfy the relationship of Cs1>Cs3.

Figure 14:
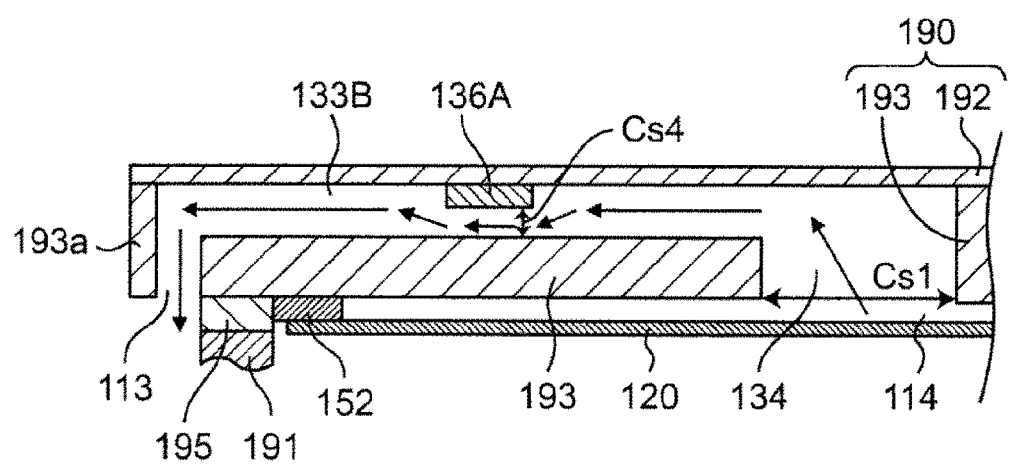
FIG. 14 is a longitudinal sectional view of the case and the surrounding area in a modification of the first embodiment.

In a second flow path 133B, as illustrated in FIG. 14, a narrowing part 136A may be disposed below the lower surface of the second plate 192. The narrowing part 136A may be a protrusion protruding from the second plate 192 toward the diaphragm 120 or a separate resin or metal member attached to the lower surface of the second plate 192.

The narrowing part 136A makes the minimum cross-sectional area Cs4 of the second flow path 133B smaller than the cross-sectional area Cs1 of the communication hole 134.

Figure 15:
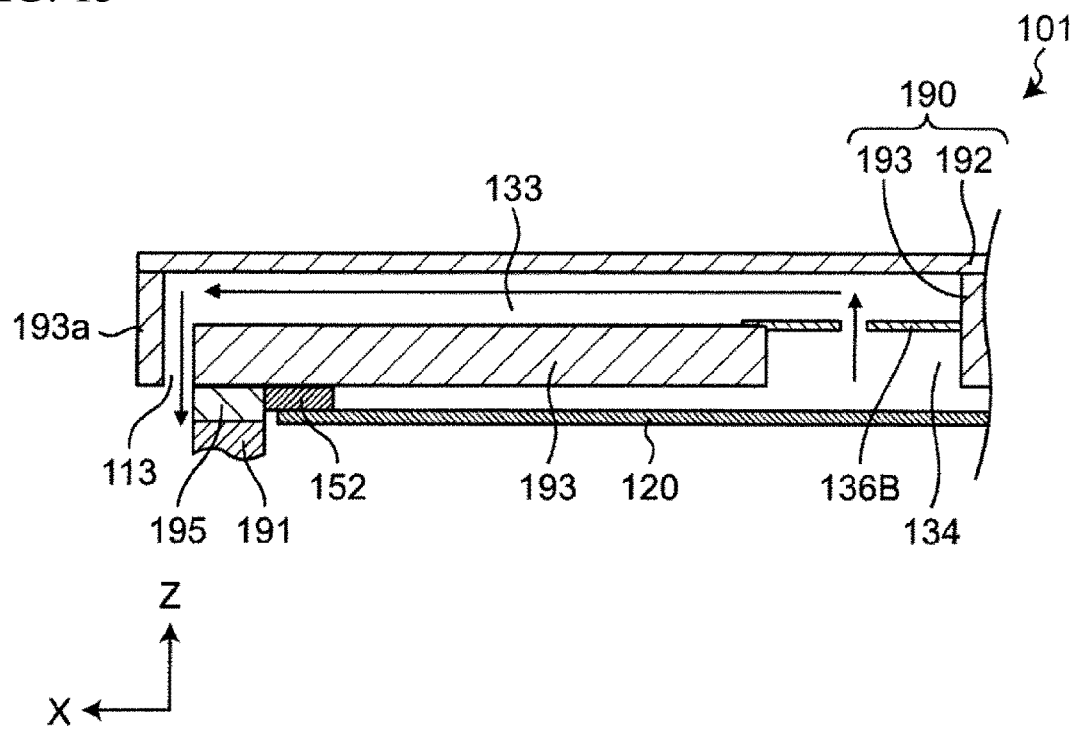
FIG. 15 is a longitudinal sectional view of the case and the surrounding area in a modification of the first embodiment.
Figure 16:
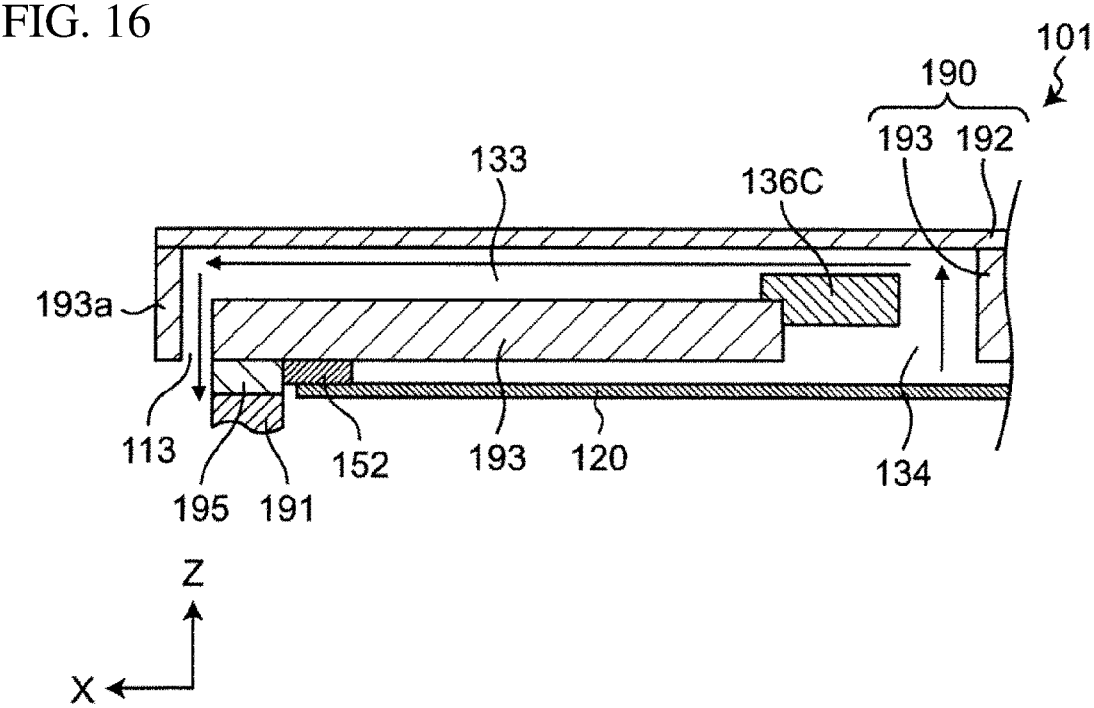
FIG. 16 is a longitudinal sectional view of the case and the surrounding area in a modification of the first embodiment.

As illustrated in FIG. 15, a narrowing part 136B may be disposed at the boundary between the communication hole 134 and the second flow path 133. As illustrated in FIG. 16, a narrowing part 136C may be disposed so as to span the communication hole 134 and the second flow path 133.

Modification 3

Figure 17:
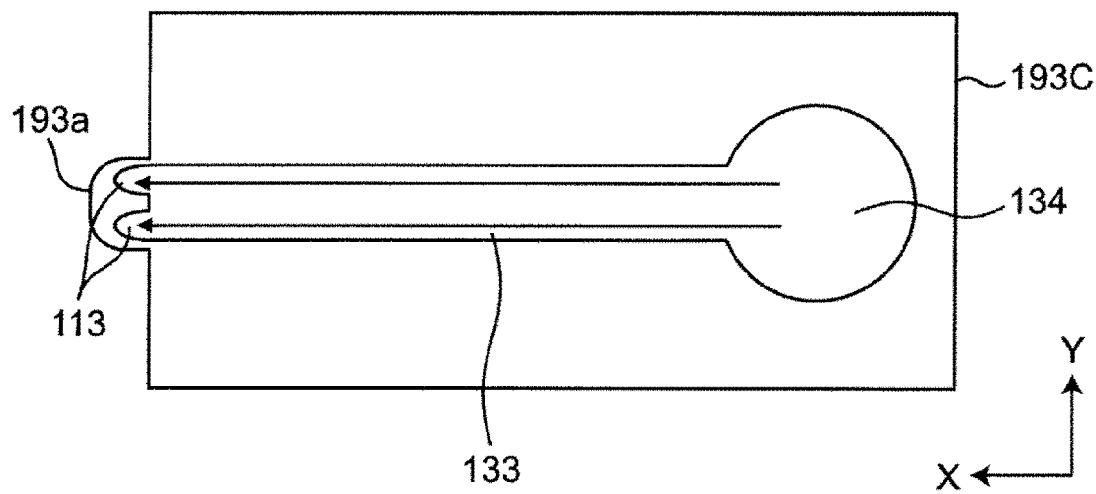
FIG. 17 is a plan view of a flow path-forming plate in a modification of the first embodiment.

Next, a valve according to a modification of the first embodiment will be described with reference to FIG. 17. FIG. 17 is a schematic plan view of a second flow path 133 of an exhaust path-forming plate 193C and the surrounding area in Modification 3. In Modification 3, the second flow path 133 is connected to two exhaust holes 113. In other words, the exhaust path-forming plate 193C has two exhaust holes 113 in a protrusion 193a. The holes at multiple sites in this way allow exhaust of air even if one of the holes is closed.

Figure 18:
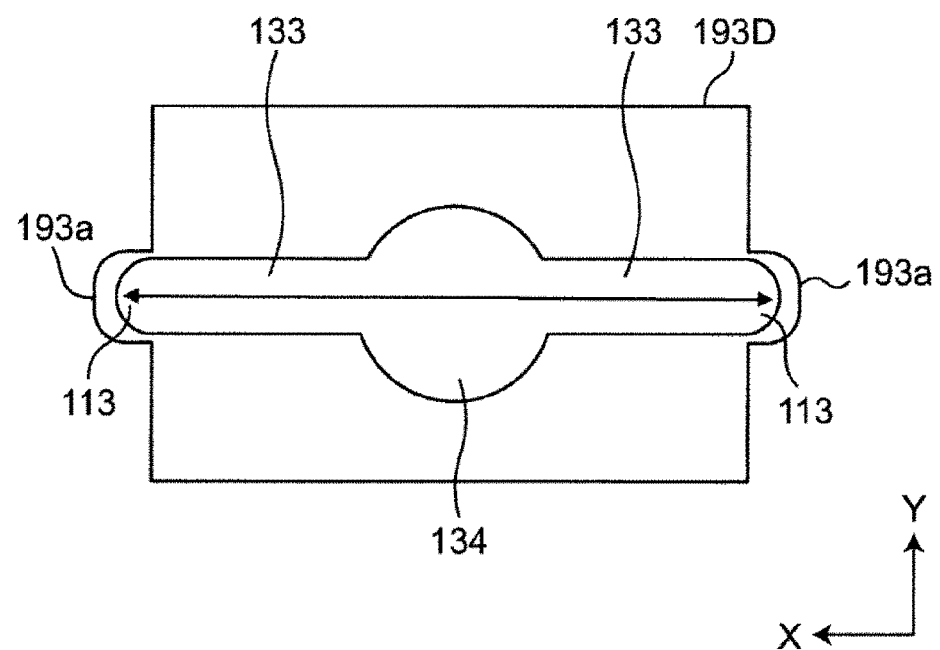
FIG. 18 is a plan view of a flow path-forming plate in a modification of the first embodiment.
Figure 19:
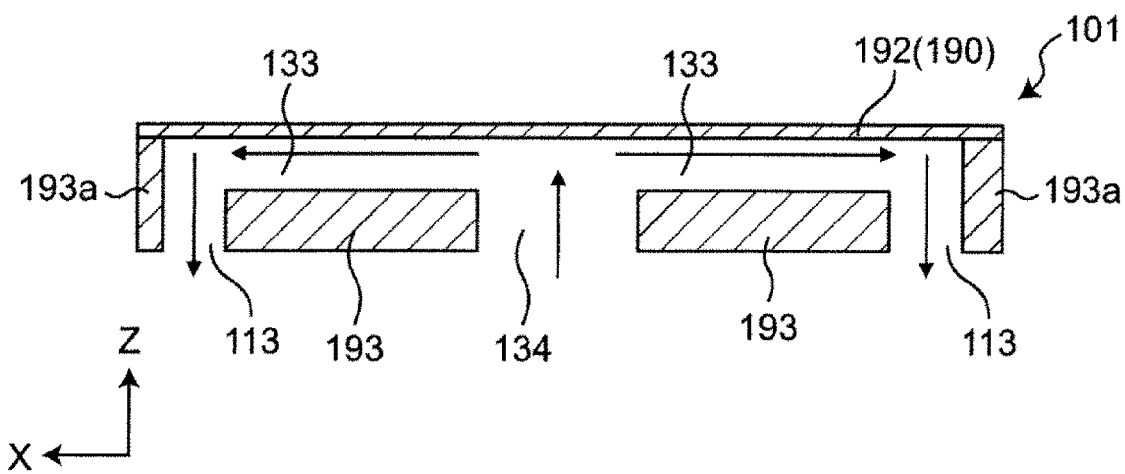
FIG. 19 is a longitudinal sectional view of the case and the surrounding area in a modification of the first embodiment.

As illustrated in FIG. 18 and FIG. 19, an exhaust path-forming plate 193D may have two protrusions 193a and may have two second flow paths 133 connected to the respective exhaust holes 113 each provided in each protrusion 193a. When the valve 101 has two second flow paths 133, the sum of the minimum cross-sectional areas of the second flow paths 133 is smaller than the cross-sectional area of the communication hole 134.

Figure 20:
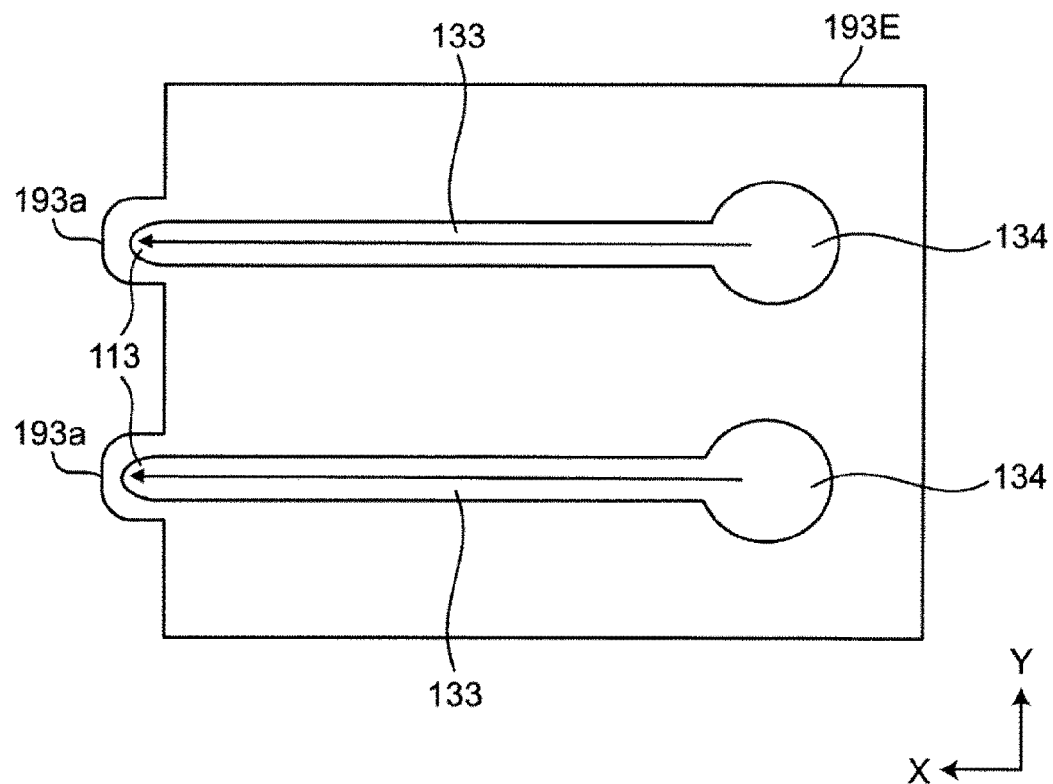
FIG. 20 is a plan view of a flow path-forming plate in a modification of the first embodiment.

As illustrated in FIG. 20, two exhaust paths each formed by the communication hole 134, the second flow path 133, and the exhaust hole 113 may be provided. Since the flow rate in each exhaust path can be reduced by providing two exhaust paths, the communication hole 134 may have a smaller size.

Modification 4

Figure 21:
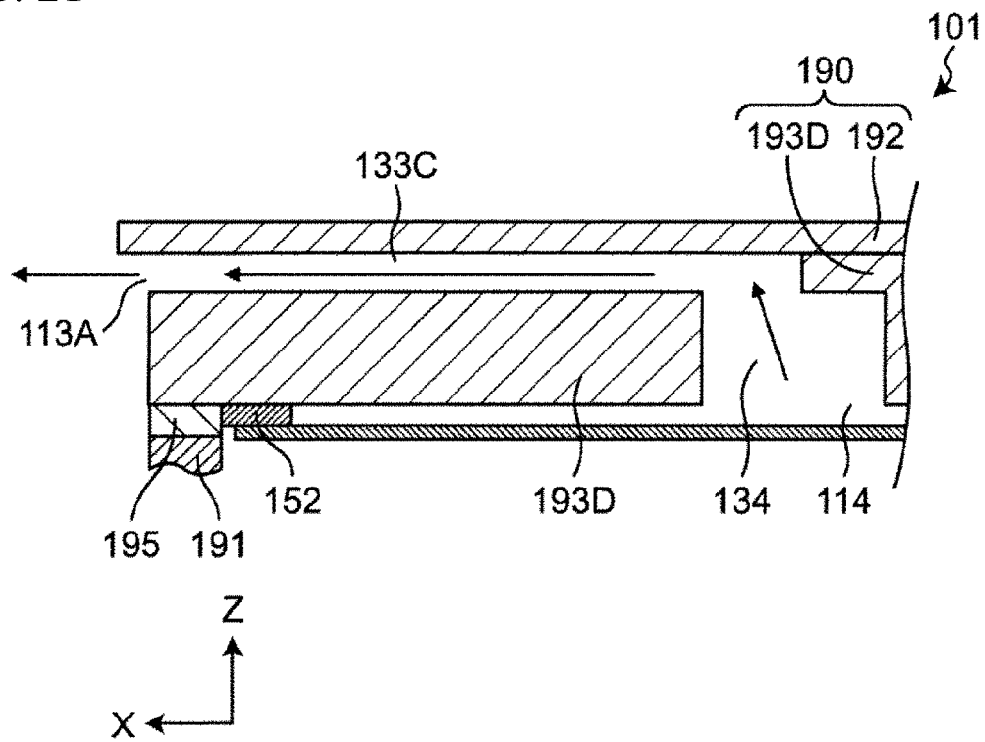
FIG. 21 is a longitudinal sectional view of a case and the surrounding area in a modification of the first embodiment.
Figure 22:
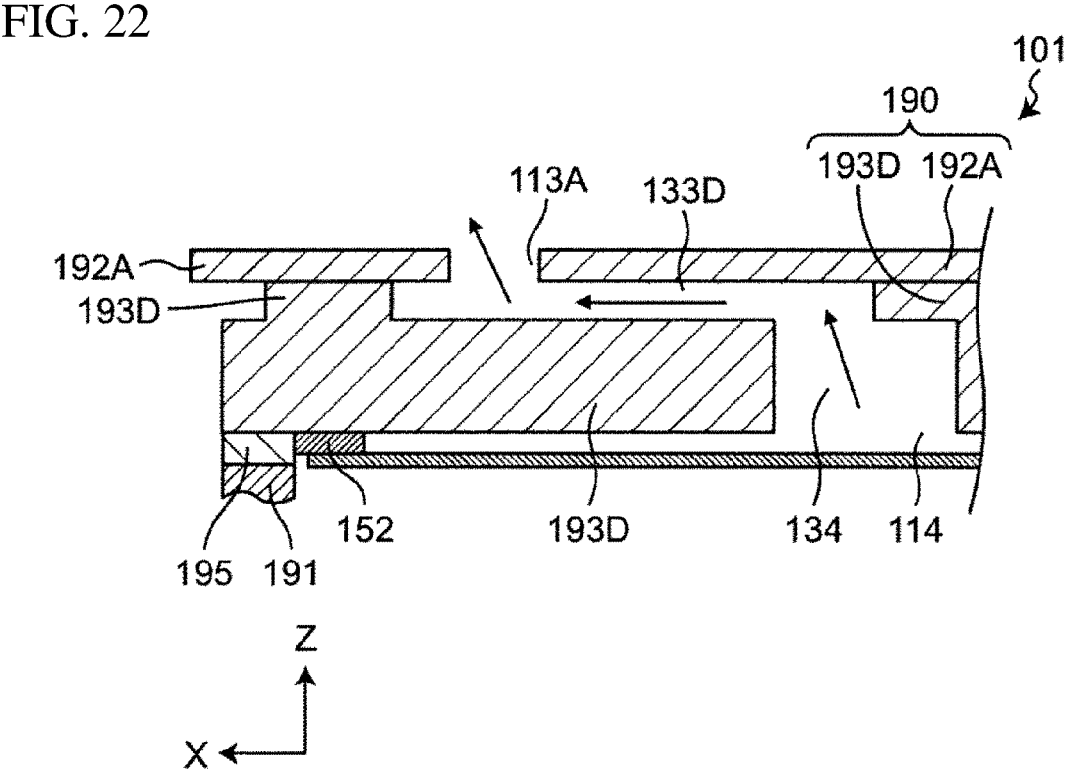
FIG. 22 is a longitudinal sectional view of a case and the surrounding area in a modification of the first embodiment.

Next, a valve according to a modification of the first embodiment will be described with reference to FIG. 21. FIG. 21 is a partial longitudinal sectional view of a valve 101 in Modification 4. In Modification 4, an exhaust hole 113A is opened to the outside from a second flow path 133C and does not face the pump 10. Thus, an exhaust path-forming plate 193D has no protrusion 193a. As illustrated in FIG. 22, a second plate 192A may have an exhaust hole 113A so that air may be exhausted toward the cuff from a second flow path 133D. The configuration according to Modification 4 facilitates attachment of the valve 101 when the case 190 is a housing of a device attached to the valve 101.

Figure 23:
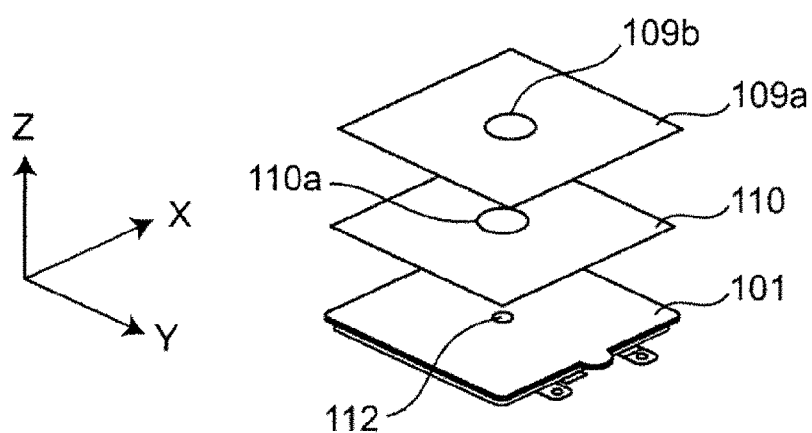
FIG. 23 is a view for describing the connection part between the valve and the cuff in the embodiment.

Next, the bonding between the valve 101 and the manchette rubber tube 109a of the cuff 109 in the first embodiment will be described with reference to FIG. 23. The valve 101 may be bonded to the manchette rubber tube 109a, which is an adhesion target, with an adhesive material 110 interposed therebetween. The adhesive material 110 is, for example, a double-sided tape. The manchette rubber tube 109a and the adhesive material 110 respectively have a hole 109b and a hole 110a at their central portions. The hole 109b and the hole 110a are in communication with the second vent hole 112.

Figure 24:
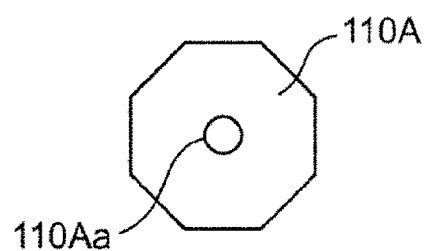
FIG. 24 is a view for describing a modification of the connection part between the valve and the cuff.

The adhesive material 110 may have a rectangular shape so as to fix four corners of the valve 101, but is preferably shaped so as not to fix four corners of the valve 101. Examples of the adhesive material shaped so as not to fix four corners include an adhesive material 110A having a polygonal shape with more vertices than squares, as illustrated in FIG. 24, and an adhesive material having a circular shape. The adhesive material 110A also has a hole 110Aa at its central portion. The hole 110Aa is in communication with the second vent hole 112.

The leakage of vibration of the vibration plate unit 60 transmitted through the valve 101 causes the four corners of the valve 101 to vibrate most in the upper surface of the valve 101. When the adhesive material 110A is shaped so as not to fix the four corners of the valve 101, the vibration transmitted to the adhesion target from the valve 101 through the adhesive material 110A can be mitigated. This configuration can improve pump characteristics.

The present disclosure is not limited to the above embodiment, and the embodiment can be modified in the following manner.

(1) In the above embodiment, air is used as a gas, but gas is not limited to air. The valve and the gas control device may be used for gas other than air.

(2) In the above embodiment, the frame member 195 is not limited to a plate member and may be a sheet member, such as a double-sided tape.

Figure 25:
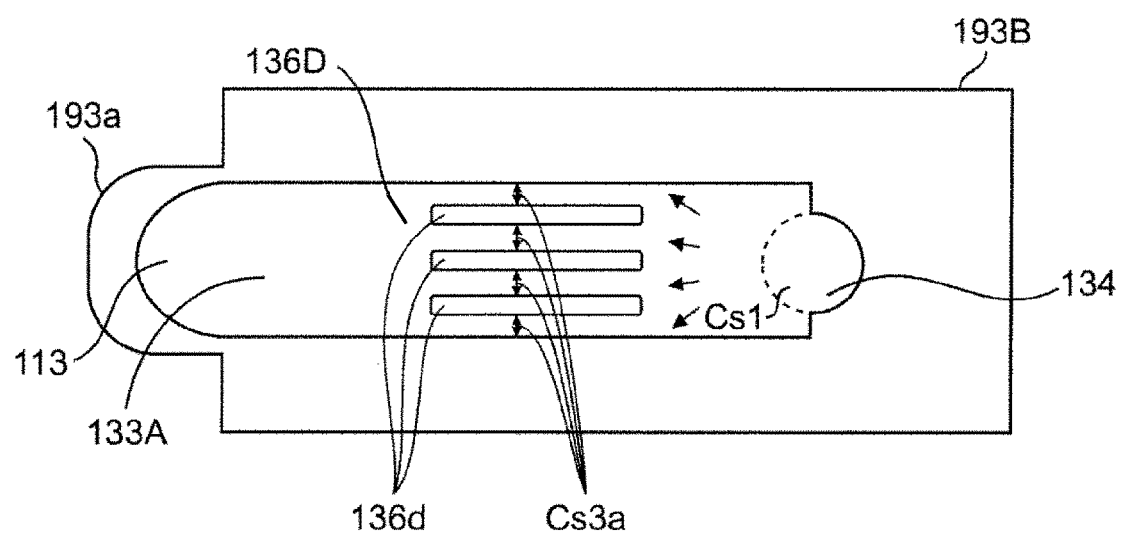
FIG. 25 is a plan view of a flow path-forming plate in a modification of the first embodiment.

(3) In Modification 2 of the first embodiment, the second flow path 133A has the narrowing part 136, but the form of the narrowing part 136 is not limited to this. For example, as illustrated in FIG. 25, a part of the second flow path 133A may be divided into multiple flow paths by multiple narrowing parts 136d. In this case, the minimum cross-sectional area Cs2 of the second flow path 133A is the sum of the cross-sectional areas Cs3a of the divided flow paths, where the cross-sectional area of each of the divided flow paths is defined as Cs3a. The sum of the cross-sectional areas of the divided flow paths is smaller than the cross-sectional area Cs1 of the communication hole 134. The example of FIG. 25 satisfies the relationship of 4×Cs3a<Cs1.

In addition to the configuration in which the narrowing parts 136d each having a rectangular shape are arranged in the second flow path 133, rectangular narrowing parts may be arranged in a staggered manner or a cylindrical narrowing part may be disposed in the second flow path 133.

When the valve chamber 131 has one communication hole 134, one second flow path 133, and two exhaust holes 113 as illustrated in FIG. 17, the cross-sectional area Cs1 of the communication hole 134 is larger than the cross-sectional area Cs2 of the second flow path 133 or the cross-sectional area of the exhaust holes 113. When the valve chamber 131 has one communication hole 134, multiple second flow paths 133, and multiple exhaust holes 113 as illustrated in FIG. 18, the cross-sectional area Cs1 of the communication hole 134 is larger than the sum of the cross-sectional areas Cs2 of the second flow paths or the sum of the cross-sectional areas of the exhaust holes 113. When the valve chamber 131 has multiple communication holes 134, multiple second flow paths 133, and multiple exhaust holes 113 as illustrated in FIG. 20, the sum of the cross-sectional areas Cs1 of the communication holes 134 is larger than the sum of the cross-sectional areas Cs2 of the second flow paths 133 or the sum of the cross-sectional areas of the exhaust holes 113.

The present disclosure can apply to a valve and a gas control device including the valve.

10 Pump
41 Piezoelectric actuator
41 Vibration plate
42 Piezoelectric element
50 Flow path-forming plate
50a Cavity
50b Flow path
51 Flexible plate
58 Movable portion
60 Vibration plate unit
61 Frame plate
70 Power feed plate
91 Substrate
92 Cavity
100 Gas control device
101 Valve
109 Cuff
109a Manchette rubber tube
109b Hole 110, 110a Adhesive material
110a, 110aa Hole
111 First vent hole
112 Second vent hole
113, 113a Exhaust hole
114 First flow path
115 Controller
120 Diaphragm
121 Hole
131 Valve chamber
133, 133a Second flow path
134 Communication hole
134a Cavity
136 Narrowing part
138 Valve seat
152 Seal member
160 Check valve
170 Exhaust valve
190 Case
191 First plate
191a, 191b, 191c Groove
191d Opening
191e Wall portion
192 Second plate
192a Protrusion
193, 193a, 193b, 193c Exhaust path-forming plate
193a Protrusion
195 Frame member

The invention claimed is:

1. A valve comprising:
a first plate having at least one first vent hole;
a second plate positioned to face a main surface of the first plate and having a second vent hole;
a valve chamber positioned between the first plate and the second plate;
a valve body positioned between the first plate and the second plate and having a third vent hole, the valve body causing the first vent hole and the second vent hole not to be in communication with each other when a periphery of the third vent hole is in contact with the first plate or the second plate, and causing the first vent hole and the second vent hole to be in communication with each other when the periphery of the third vent hole is separated from the first plate and the second plate;
an exhaust path-forming plate positioned between the second plate and the valve body, forming a first flow path between the exhaust path-forming plate and the valve body, forming at least one second flow path between the exhaust path-forming plate and the second plate, and having a fourth vent hole through which the first flow path is in communication with the second flow path; and
at least one fifth vent hole positioned between the first plate and the exhaust path-forming plate or between the exhaust path-forming plate and the second plate,
wherein the first flow path establishes communication between the second vent hole and the fourth vent hole, and the second flow path establishes communication between the fourth vent hole and the fifth vent hole,
the valve body causes the first flow path and the second flow path not to be in communication with each other when the valve body is in contact with a periphery of the fourth vent hole, and the valve body causes the first flow path and the second flow path to be in communication with each other when the valve body is separated from the periphery of the fourth vent hole,
a minimum cross-sectional area of the second flow path or a cross-sectional area of the fifth vent hole is smaller than a cross-sectional area of an opening of the fourth vent hole, and
a direction in which the fourth vent hole extends differs from a direction in which the second flow path extends.

2. The valve according to claim 1,
wherein the minimum cross-sectional area of the second flow path is smaller than a cross-sectional area of an opening of the fifth vent hole.

3. The valve according to claim 2,
wherein the second flow path has a narrowing part.

4. The valve according to claim 2,
wherein the at least one fifth vent hole comprises a plurality of fifth vent holes.

5. The valve according to claim 2,
wherein the at least one second flow path comprises a plurality of second flow paths.

6. The valve according to claim 2,
wherein the second plate is a part of a case accommodating the valve.

7. The valve according to claim 2,
wherein the first plate has a groove around the first vent hole.

8. The valve according to claim 1,
wherein the second flow path has a narrowing part.

9. The valve according to claim 8,
wherein the at least one fifth vent hole comprises a plurality of fifth vent holes.

10. The valve according to claim 8,
wherein the at least one second flow path comprises a plurality of second flow paths.

11. The valve according to claim 8,
wherein the second plate is a part of a case accommodating the valve.

12. The valve according to claim 1,
wherein the at least one fifth vent hole comprises a plurality of fifth vent holes.

13. The valve according to claim 12,
wherein the at least one second flow path comprises a plurality of second flow paths.

14. The valve according to claim 12,
wherein the second plate is a part of a case accommodating the valve.
15. The valve according to claim 1,
wherein the at least one second flow path comprises a plurality of second flow paths.
16. The valve according to claim 15,
wherein the second plate is a part of a case accommodating the valve.
17. The valve according to claim 1,
wherein the second plate is a part of a case accommodating the valve.
18. The valve according to claim 1,
wherein the first plate has a groove around the first vent hole.
19. The valve according to claim 1,
wherein the at least one first vent hole comprises a plurality of first vent holes.
20. A gas control device comprising:
the valve according to claim 1;
a pump connected to the valve chamber; and
a container connected to the first flow path.

* * * * *

UNITED STATES PATENT AND TRADEMARK OFFICE
CERTIFICATE OF CORRECTION

PATENT NO. : 11,365,816 B2  
APPLICATION NO. : 17/176343  
DATED : June 21, 2022  
INVENTOR(S) : Yukiharu Kodama Page 1 of 1

It is certified that error appears in the above-identified patent and that said Letters Patent is hereby corrected as shown below:

In the Specification

Column 15, Line 8, "41" should be -- 40 --.

Signed and Sealed this  
Fourteenth Day of March, 2023

Katherine Kelly Vidal  
*Director of the United States Patent and Trademark Office*